R. H. MARTIN.
WHEEL.
APPLICATION FILED FEB. 17, 1922.

1,419,162.

Patented June 13, 1922.
2 SHEETS—SHEET 1.

Inventor
R. H. Martin
By
Attorneys

R. H. MARTIN.
WHEEL.
APPLICATION FILED FEB. 17, 1922.
1,419,162.
Patented June 13, 1922.
2 SHEETS—SHEET 2.
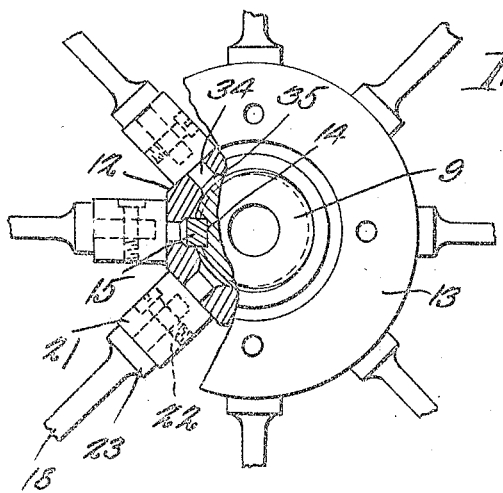
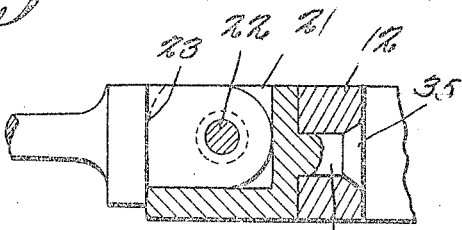
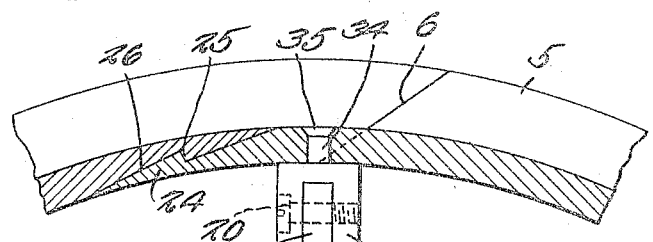
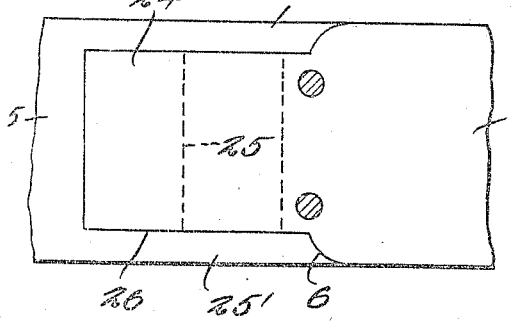
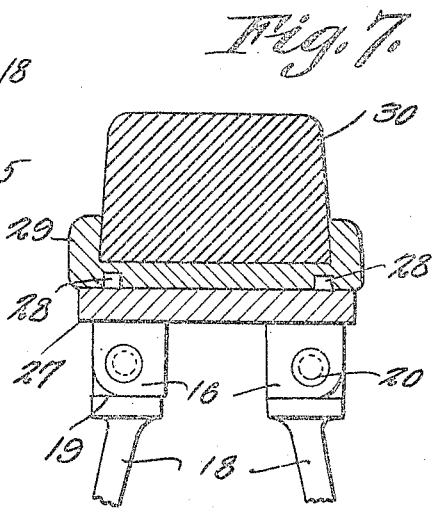
Inventor
R. H. Martin

UNITED STATES PATENT OFFICE.

RICHARD H. MARTIN, OF GAINESVILLE, GEORGIA.

WHEEL.

1,419,162.   Specification of Letters Patent.   Patented June 13, 1922.

Application filed February 17, 1922. Serial No. 537,206.

*To all whom it may concern:*

Be it known that I, RICHARD H. MARTIN, a citizen of the United States, residing at Gainesville, in the county of Hall and State of Georgia, have invented a new and useful Wheel, of which the following is a specification.

This invention has reference to motor vehicle wheels, and more particularly to wire wheel constructions.

The primary object of the invention is to provide a metal spoke wheel constructed in a manner to facilitate the application and removal of solid or pneumatic tires.

Another object of the invention is to provide a wheel having a sectional rim, novel means being provided to move the rim sections towards the hub of the wheel to lessen the diameter of the rim.

A still further object of the invention is the provision of means for tensioning the spokes and locking the rim sections in their extended positions, eliminating any possibility of the rim sections contracting accidentally.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a fragmental detail view of a wheel hub, a portion thereof being broken away to illustrate the connection between the hub and spokes.

Figure 4 is an enlarged detail view of the connection between the hub and spokes.

Figure 5 is a fragmental detail view of the felloe or rim disclosing the connection between the felloe and spoke.

Figure 6 is a bottom plan view of adjacent sections.

Figure 7 is a sectional view disclosing a demountable rim section positioned on a wheel constructed in accordance with the invention.

Figure 1:
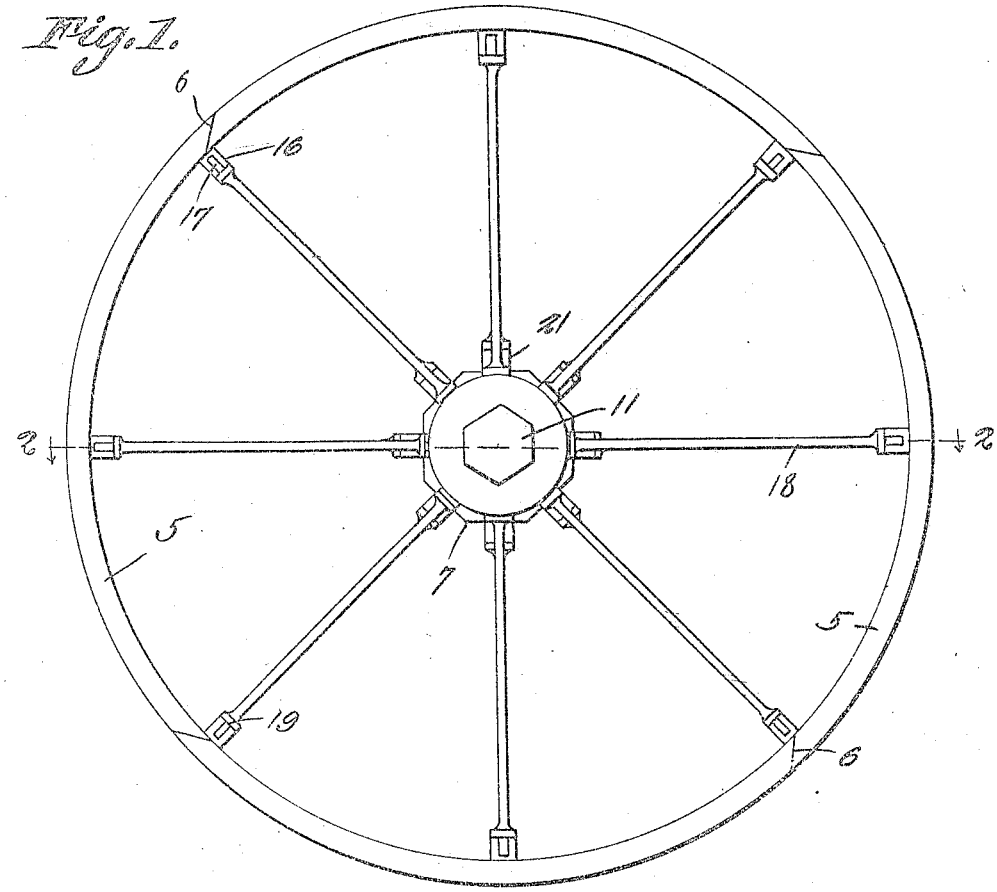
Figure 1 is a side elevational view of a wheel constructed in accordance with the present invention.
Figure 2:
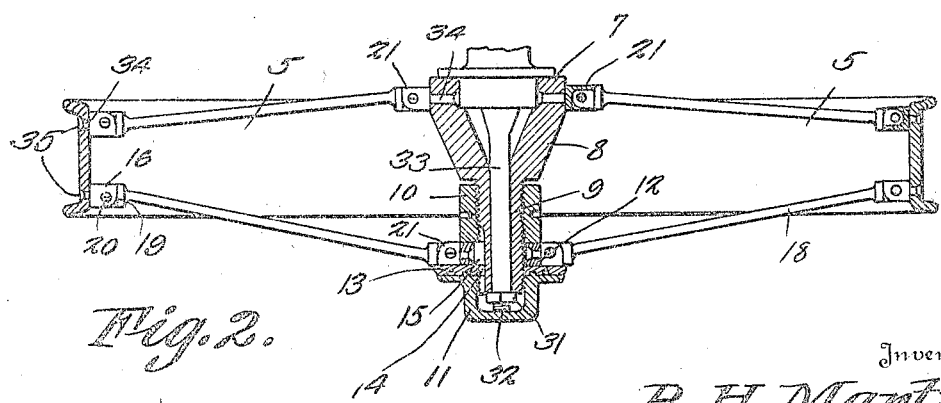
Figure 2 is a sectional view taken on line 2—2 of Figure 1.

Referring to the drawings in detail, the wheel is shown as including rim sections 5, each of which is formed with beveled ends 6, so that the adjacent ends of the sections will bind at their points of contact to insure a close-fit between the adjacent sections.

The hub includes a main or body portion 7 which tapers to the outer portion of the wheel, as at 8, where the same is formed into a hollow reduced portion 9 which accommodates the axle on which the wheel is mounted. This reduced portion 9 is formed with threads disposed throughout the length thereof to accommodate the adjusting sleeve 10, which cooperates with the cap 11 to clamp the movable section or supporting ring 12, to the reduced portion 9 of the hub. Secured to the reduced section 9, and disposed between the cap 11 and supporting ring 12, is a securing disk 13 which contacts with the ring 12 to force the same longitudinally of the reduced portion 9 of the hub, to tension the spokes, movement of the disk 13 being accomplished by rotation of the cap 11.

A groove 14 is formed in one edge of the reduced portion 9 and accommodates the key 15 carried by the supporting ring 12, so that rotation of the ring with respect to the hub of a wheel will be prevented.

Spaced ears are carried by the inner surface of the sections of the rim, the ears being indicated at 16, and adapted to receive the reduced portions 17 of the spokes 18, which radiate from the hub. Shoulders 19 are formed at the outer ends of the respective spokes, which shoulders contact with the free ends of the ears to direct the strain to the body portion of the spokes, and at the same time relieve the pivot pins 20 which secure the spokes to the ears, of this strain.

The supporting ring 12 as well as the body portion 7 of the hub, is provided with spaced ears 21 which accommodate the inner ends of the spokes, the spokes being pivotally secured between the ears as by means of the pivot pins 22. Shoulders 23 are also formed on the inner ends of the spokes, and are adapted to contact with the ends of the ears 21 to relieve the pins 22 of the strain directed to the hub by the weight of the vehicle supported on the wheel.

In order that the sections of the rim may be held in locked relation with each other, each of the sections is formed with a tongue 24, which tongue has a shoulder 25 to be received within a suitable opening 26 formed in the adjacent end of the cooperating section, suitable flanges 25' being formed on the sections and cooperating with the tongues to prevent lateral movement of the tongues.

In the form of the invention as shown by Figure 7 of the drawing, the rim, which is indicated at 27 is formed with lugs 28 to be positioned in suitable openings formed in the rim 29, which carries the cushion tire 30. From the foregoing it will be seen that due to the construction as described, a wire wheel may be readily and easily collapsed to reduce the diameter thereof, and allow the same to be readily and easily positioned within a tire or rim of a fixed diameter.

After the tire or rim has been positioned, the nut which is indicated at 31 and operates on the threaded portion 32 of the axle 33, is rotated to draw the body portion of the hub towards the supporting ring 12. The cap 11 is now rotated to force the disk 13 towards the supporting ring 12 to tension the spokes. If wear should occur between the elements of the wheel, the adjusting sleeve 10 may be readily rotated to compensate for the wear, permitting the supporting ring 12 to be moved into closer relation with the body portion 7 of the hub.

It might be further stated that the ears 21 are formed with a shank 34 which are positioned in suitable openings of the hub or rim section, the ends of the shanks being headed as at 35 to secure the ears in position.

Having thus described the invention, what is claimed as new is:

1. A wheel including a sectional rim, means for locking the adjacent ends of the sections together, spaced ears carried by the rim sections, an adjustable hub, ears carried by the adjustable hub, spokes pivotally supported between the ears, said spokes having shoulders, and said shoulders adapted to contact with the ends of the ears.

2. A wheel including a sectional rim, a hub comprising a main portion having a reduced threaded extremity, said reduced threaded extremity being formed with a groove, a supporting ring positioned on the reduced portion and carrying a key adapted to move in the groove to restrict rotary movement of the ring with respect to the hub, spokes for connecting the rim sections and hub, means for restricting movement of the supporting ring with respect to the hub, longitudinally thereof, and a cap positioned on one end of the hub.

In testimony that I claim the foregoing as my own, I have hereto affixed my signature in the presence of two witnesses.

RICHARD H. MARTIN.

Witnesses:
C. E. SMITH,
M. A. MEDLOCK.